No. 718,182. PATENTED JAN. 13, 1903.
E. R. WHITNEY.
ELECTRICALLY CONTROLLED ORGAN BELLOWS.
APPLICATION FILED JUNE 21, 1901.
NO MODEL. 2 SHEETS—SHEET 1.

Witnesses.
Erving R. Gurney.
Benjamin R. Hull.

Inventor
Eddy R. Whitney.
by Albert S. Davis,
Atty

No. 718,182. PATENTED JAN. 13, 1903.
E. R. WHITNEY.
ELECTRICALLY CONTROLLED ORGAN BELLOWS.
APPLICATION FILED JUNE 21, 1901.
NO MODEL. 2 SHEETS—SHEET 2.

Witnesses
Ewing R. Gurney.
Benjamin B. Hull.

Inventor
Eddy R. Whitney
by Albert G. Davis
Atty.

UNITED STATES PATENT OFFICE.

EDDY R. WHITNEY, OF LYNN, MASSACHUSETTS, ASSIGNOR TO GENERAL ELECTRIC COMPANY, A CORPORATION OF NEW YORK.

ELECTRICALLY-CONTROLLED ORGAN-BELLOWS.

SPECIFICATION forming part of Letters Patent No. 718,182, dated January 13, 1903.

Application filed June 21, 1901. Serial No. 65,401. (No model.)

*To all whom it may concern:*

Be it known that I, EDDY R. WHITNEY, a citizen of the United States, residing at Lynn, county of Essex, State of Massachusetts, have invented certain new and useful Improvements in Electrically-Controlled Organ-Bellows, (Case No. 1,912,) of which the following is a specification.

The object of this invention is to provide an improved pumping mechanism for organ-bellows, and particularly such types as are provided with electric motors for supplying air.

In carrying out the invention I provide means operated by the bellows for automatically opening and closing the motor-circuit, the motor-switch being opened rapidly by energy stored by the movement of the bellows, so as to avoid arcing at the switch-contacts. To this end I provide a reciprocating rod connected with the bellows in sliding relation to a snap-switch connected between two control-springs mounted in a frame in which the rod slides and adapted to be connected thereto at determinate positions of the bellows by coupling devices, thereby putting the switch under strain by an ascending and descending of the bellows and storing energy to permit a rapid operating movement. I provide also latching devices for locking the switch against movement until the bellows are empty or have collapsed a predetermined amount, when the latches are automatically opened and the switch instantly shifted. So when the motor is running the switch is held closed until a sufficient quantity of air has been pumped. In order to permit the starting-current to be gradually admitted to the motor, I provide an automatic rheostat operated by the bellows by which resistance is gradually cut out of motor-circuit as the bellows fill.

The novel features of my invention will be hereinafter more particularly described and will be definitely indicated in the claims appended to this specification.

Figure 1:
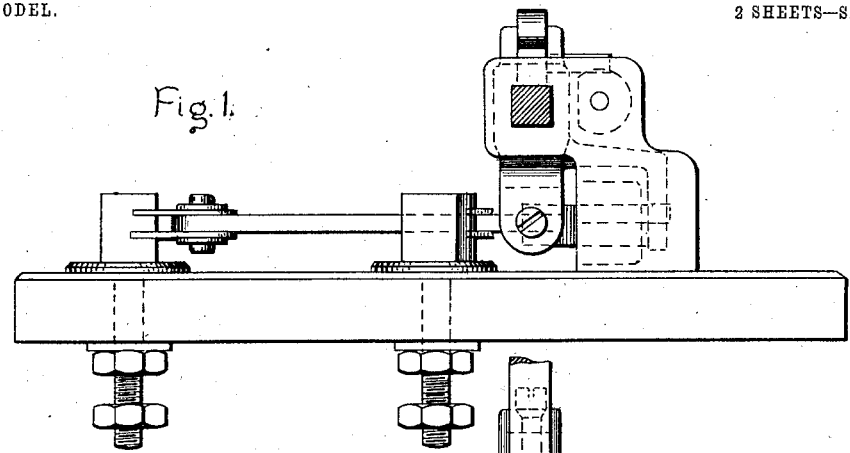
Figure 2:
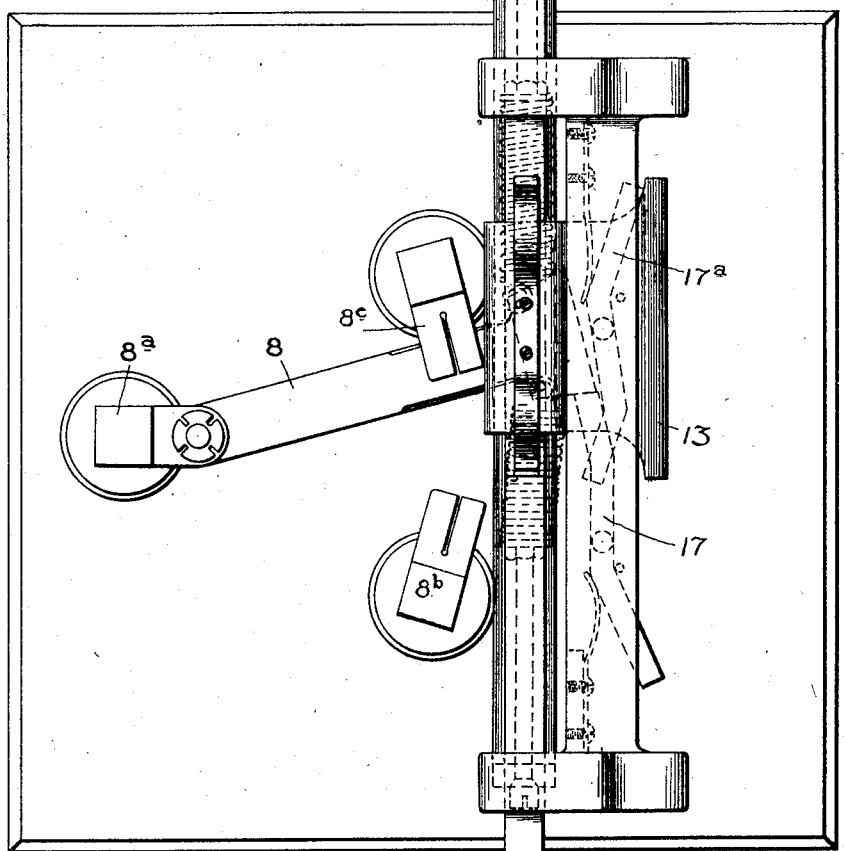
Figure 3:
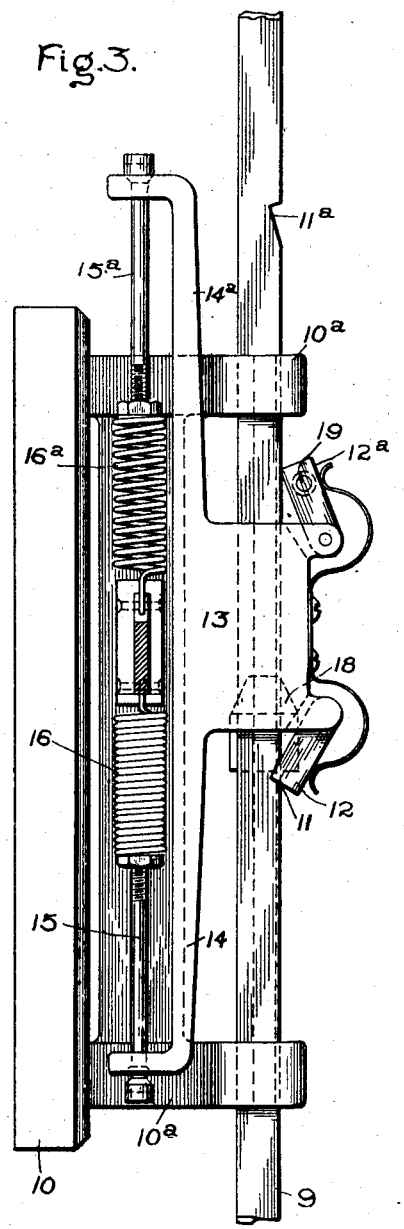

In the accompanying drawings, which illustrate my invention, Figure 1 is a top plan view of a controlling device embodying my improvements. Fig. 2 is a side elevation. Fig. 3 is an end elevation, and Fig. 4 is a diagram showing the relation of the operating-motor and its control-circuit to the bellows.

Figure 4:
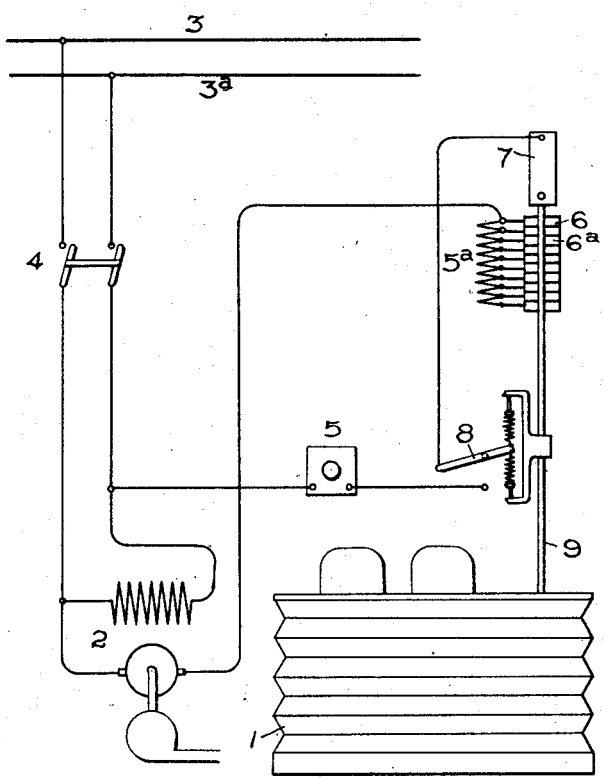

The relation of the switch to the motor and bellows may be best understood by a brief examination of the diagram Fig. 4, in which—

1 represents a bellows for an organ or other wind instrument, and 2 an electric motor for maintaining air-pressure therein through any suitable pump. The motor may be supplied from a municipal distribution-circuit, as indicated at 3 $3^a$, and controlled by a main switch 4. It may also be provided with the usual starting-rheostat, as 5; but I provide in its armature-circuit a regulating-rheostat $5^a$, the resistance units of which are connected with a row of insulated plates 6 $6^a$, &c., over which may slide a contact-piece 7, adapted when the bellows are empty or nearly empty to cut in a major portion of the resistance $5^a$, so that when the switch 8 is closed by the collapse of the bellows the maximum amount of resistance will be in the armature-circuit, thereby cutting down its starting-current. As the bellows fill the contact-plate 7 gradually short-circuits more and more of the resistance until the motor attains maximum speed, and after the bellows have been sufficiently filled the switch 8 is automatically opened and the motor stops. In the mechanism which I have provided the motor is cut out of circuit when the bellows are almost filled and is started up again before they are completely emptied. The rod 9, connected to the bellows, slides in suitable guides in a fixed frame $10^a$ and is provided with two notches 11 $11^a$, adapted to be engaged, respectively, during opposite directions of bellows movement by spring-pressed pivoted dogs 12 $12^a$, which alternately couple a frame 13 with the rod 9. This frame is provided with two arms 14 $14^a$, bent at their ends, as indicated in Fig. 3, and provided with holes to accommodate links 15 $15^a$, each of which is spring-connected with the switch-lever 8 by means of tension-springs 16 $16^a$. The switch-lever is pivoted on a stud $8^a$, which forms a circuit-terminal and may be shifted between the jaws of phosphor-bronze clips, one of which, as $8^b$, forms a circuit-terminal.

On the frame in which the rod 9 slides are mounted spring-pressed latches 17 $17^a$, adapted to drop behind shoulders on the switch-lever 8, as indicated in dotted lines in Fig. 2, and locked in either of its two positions. These latches are provided with extensions, which are shifted outward when in latching action into the path of the sliding frame 13, so that as this frame moves under the expansion or collapse of the bellows (being connected to the bellows by means of the notches 11 11ª) it first strains one of the springs 16 16ª and then the edge of the slide 13 trips the latch 17 or 17ª and releases the switch, which under the tension of the spring instantly opens or closes the circuit without damage from arcing.

As shown in Fig. 3, the frame is latched to the bellows-rod for an expanding movement and the motor has been put on closed circuit by the switch 8. As the bellows fill the rod 9 is pushed up, carrying with it by reason of the latch 12 the frame 13, and the latch 17ª will have fallen behind the upper corner of the switch end, locking it against movement until the bellows have filled to the proper point, when the end of the slide 13 will push in the upper end of latch 17ª, releasing the switch-blade and permitting the spring 16ª, which has been stretched meantime, to instantly open the circuit and throw the switch-lever into the idle clip 8ᶜ. When the switch-blade 8 is slipped into the idle clip, the spring-pressed latch 17 falls behind the lower shoulder on its end, locking it against downward movement, and as the air in the bellows is consumed and its pressure lowered in collapsing it gradually stores tension in the spring 16 (the switch-blade being locked meantime by the latch 17) until the shoulder of the slide 13 glides over the lower end of the latch 17, pushing its upper end away from the switch-blade and permitting the stretched spring 16 to instantly close the circuit. The notches 11 11ª are placed a sufficient distance apart on the rod 9 to permit the desired extent of bellows movement. When the line-switch is open and the motor shut down for the day, the bellows will of course become completely emptied and will go below the lower limit referred to above. In order to permit a complete collapse, the dog 12ª may be thrown out of the notch 11ª by means of a cam 18, secured to a fixed part of the frame, the sloping face of which engages a pin 19, fastened to the upper dog, and throws it out of the notch 11ª. The pump operated by the electric motor may be of any ordinary construction. As my improvements relate only to the regulating devices hereinabove described I have deemed it unnecessary to describe it in detail.

What I claim as new, and desire to secure by Letters Patent of the United States, is—

1. The combination with a bellows, of an electric motor for maintaining air-pressure, a snap-switch in the motor-circuit, means for detaining said switch at determinate positions of the bellows, and a spring put under tension by an opening movement of the bellows, to rapidly operate the switch and cut out the motor.

2. The combination with a bellows, of an electric motor for maintaining air-pressure, a snap-switch controlling the motor-circuit, a detent preventing switch movement, a spring connected to the switch adapted to be strained by a bellows movement, and means for automatically releasing the detent and permitting the spring to operate the switch in a determinate position of the bellows.

3. The combination with a bellows, of an electric motor for filling the same with air, a rod connected with the bellows, a frame in sliding relation thereto spring-connected with the motor-switch, means for latching the frame to the rod at determinate positions of the bellows, and a snap-switch in the motor-circuit spring-connected to the sliding frame.

4. The combination with a bellows, of an electric motor for filling the same with air, a spring-controlled snap-switch in the motor-circuit, a rod connected to the bellows, a frame sliding thereon adapted to be clutched therewith after determinate range of bellows movement in either direction, detents for locking the switch, connections between the sliding frame and the switch, and means for releasing the detents after the switch-spring has been put under strain.

5. The combination with a bellows, of an electric motor for operating the same, a snap-switch in the motor-circuit, a spring connected with the snap-switch, means for connecting the same with the movable part of the bellows to automatically close the motor-circuit at a determinate position of bellows collapse, and means for automatically disconnecting the spring when the main-line current is cut off.

In witness whereof I hereunto set my hand this 13th day of June, 1901.

EDDY R. WHITNEY.

Witnesses:
DUGALD McK. McKILLOP,
JOHN A. McMANUS.